United States Patent
Hall et al.

(10) Patent No.: US 6,956,899 B2
(45) Date of Patent: *Oct. 18, 2005

(54) PRECISE BIT CONTROL APPARATUS WITH LOOK-AHEAD FOR MPEG ENCODING

(75) Inventors: Barbara A. Hall, Endwell, NY (US); John A. Murdock, Apalachin, NY (US); Agnes Y. Ngai, Endwell, NY (US); Edward F. Westermann, Endicott, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 583 days.

(21) Appl. No.: 09/046,285

(22) Filed: Mar. 23, 1998

(65) Prior Publication Data

US 2001/0038669 A1 Nov. 8, 2001

(51) Int. Cl.[7] ................................................ H04N 7/12
(52) U.S. Cl. ............. 375/240.03; 375/240; 375/240.01; 375/240.12; 375/240.16
(58) Field of Search ................................. 348/384, 421, 348/419; 375/240, 240.03, 240.16, 240.01, 240.02, 240.12; 704/215

(56) References Cited

U.S. PATENT DOCUMENTS

| 4,053,712 | A | * | 10/1977 | Reindl ........................ 704/215 |
| 5,089,888 | A | * | 2/1992 | Zdepski et al. ........ 375/240.03 |
| 5,111,292 | A | * | 5/1992 | Kuriacose et al. .......... 348/384 |
| 5,198,900 | A | * | 3/1993 | Tsukagoshi ............ 375/240.16 |
| 5,263,100 | A | * | 11/1993 | Kim et al. ................... 382/239 |
| 5,294,974 | A | * | 3/1994 | Naimpally et al. ......... 348/419 |
| 5,349,383 | A | * | 9/1994 | Parke et al. ................. 348/419 |
| 5,802,213 | A | * | 9/1998 | Gardos ........................ 382/239 |
| 6,028,896 | A | * | 2/2000 | Jang et al. ................... 382/239 |

* cited by examiner

*Primary Examiner*—Allen Wong
(74) *Attorney, Agent, or Firm*—Scully, Scott, Murphy & Presser; Arthur Samodovitz

(57) ABSTRACT

A method and system for encoding digital video picture data. In accordance with this method, the video picture data is partitioned into a group of blocks, at least some of those blocks are selected, one block at a time, and each of the selected blocks of data is encoded to form an encoded coefficient having an associated number of bits. The encoded coefficients are outputted, and an accumulated sum of the number of bits in the outputted encoded coefficients is kept. The outputting of the encoded coefficients is terminated at a defined time in order to prevent the accumulated sum from exceeding a given number.

12 Claims, 1 Drawing Sheet

PRECISE BIT CONTROL APPARATUS WITH LOOK-AHEAD FOR MPEG ENCODING

BACKGROUND OF THE INVENTION

This invention generally relates to compressing digital video data, and more specifically, to methods and systems using MPEG standards for compressing such data.

Full motion video displays based upon analog video signals have long been available in the form of television. With recent increases in computer processing capabilities and affordability, full motion video displays based upon digital video signals are becoming more widely available. Digital video systems can provide significant improvements over conventional analog video systems in creating, modifying, transmitting, storing, and playing full motion video sequences.

Digital video displays include large numbers of image frames that are played or rendered successively at frequencies of between 30 and 75 Hz. Each image frame is a still image formed from an array of pixels according to the display resolution of a particular system. As examples, VHS based systems have display resolutions of 320×480 pixels, NTSC based systems have display resolutions of 720×486 pixels, and high-definition television (HDTV) systems have display resolutions of 1360×1024 pixels.

The amounts of raw digital information included in video sequences are massive. The storage and transmission of these massive amounts of video information is infeasible with conventional personal computer equipment. For instance, a two hour full length motion picture, shown in VHS image format, may have 100 gigabytes of digital information.

In response to the limitations in storing or transmitting such massive amounts of digital video information, various video compression standards or processes have been established, including MPEG-1 and MPEG-2. These conventional video compression techniques utilize similarities between successive image frames, referred to as temporal or interframe correlation, to provide interframe compression in which pixel based representations of image frames are converted to motion representations. In addition, the conventional video compression techniques use similarities within image frames, referred to as spatial or intraframe correlation, to provide intraframe compression in which the motion representations within an image frame are further compressed. Intraframe compression is based upon conventional processes for compressing still images, such as discrete cosine transform (DCT) encoding.

The MPEG standard provides interframe and intraframe compression based upon square blocks or arrays of pixels in video images. A video image is divided into macroblocks having dimensions of 16×16 pixels. Each macroblock 16×16 is broken into 4 8×8 luminances blocks and 2 or 4 8×8 chrominance blocks. For each macroblocks $T_n$ in an image frame N, a search is performed across the image of the next successive video frame N+1 or an immediately preceding image frame N−1 (i.e., bidirectionally) to identify the most similar respective macroblocks $T_{N+1}$ or $T_{N-1}$.

In an ideal case, the pixels in macroblocks $T_N$ and $T_{N+1}$ are identical, even if the macroblocks have different positions in their respective image frames. Under these circumstances, the pixel information in macroblocks $T_{N+1}$ is redundant to that in macroblocks $T_N$. Compression is achieved by substituting the positional translation between macroblocks $T_N$ and $T_{N+1}$. In this simplified example, a single translation vector (Δx, Δy) is designated for the video information associated with the 256 pixels in macroblocks $T_{N+1}$.

With prior art MPEG compression, or encoding, routines, each macroblocks of pixels, or coefficients, is encoded by a variable length encoding (VLE) unit, and then sent to a compressed output interface as part of an encoded bitstream. In constant bitrate (CBR) encoding, the average compressed output, which consists of headers plus VLE unit output, must match a user selected bitrate. The encoding system translates the bitrate into target bits per picture and subsequently into target bits per block. The bits used by the headers are predictable, but the bits used by the VLE unit output are variable. If the VLE unit passes the first N bits of its output per block, where N is the target bits per block, then a constant bitrate can be achieved. If the number of bits being used per block is known in advance, the speed of the encoding process can be increased by eliminating the time needed to wait for the actual number of bits to be reported. A sophisticated look-ahead bit production scheme is needed to accomplish this.

SUMMARY OF THE INVENTION

An object of this invention is to encode a digital video picture to an exact size, in terms of number of bits, using an MPEG digital encoder in real-time.

Another object of this invention is to provide an encoding method and system that may be used to help maintain an exact bitrate while encoding digital video in real-time.

These and other objectives are obtained with a method and system for encoding digital video picture data. In accordance with this method, the video picture data is partitioned into a group of blocks, at least some of those blocks are selected, one block at a time, and each of the selected blocks of data is encoded to form encoded coefficients having an associated number of bits. The encoded coefficients are outputted, and an accumulated sum of the number of bits in the outputted encoded coefficients is kept. The outputting of the encoded coefficients is terminated at a defined time in order to prevent the accumulated sum from exceeding a given number.

Preferably, the group of blocks that are partitioned from the video picture data, have a defined order, and the selected blocks are encoded in this defined order. Also, with this preferred arrangement, after each time one of the encoded coefficients is outputted, a look-ahead sum is determined by adding (1) the above-mentioned accumulated sum, and (2) the number of bits in the encoded coefficient next in the defined order within the block. The outputting of the encoded coefficients is terminated when that look-ahead sum is greater than the given number.

Further benefits and advantages of the invention will become apparent from a consideration of the following detailed description, given with reference to the accompanying drawing, which specifies and shows a preferred embodiment of the invention.

BRIEF DESCRIPTION OF THE DRAWING

The sole FIGURE in the drawing is a block diagram of a digital video picture encoder.

DETAILED DESCRIPTION OF THE PREFERRED EMBODIMENTS

Figure 1:
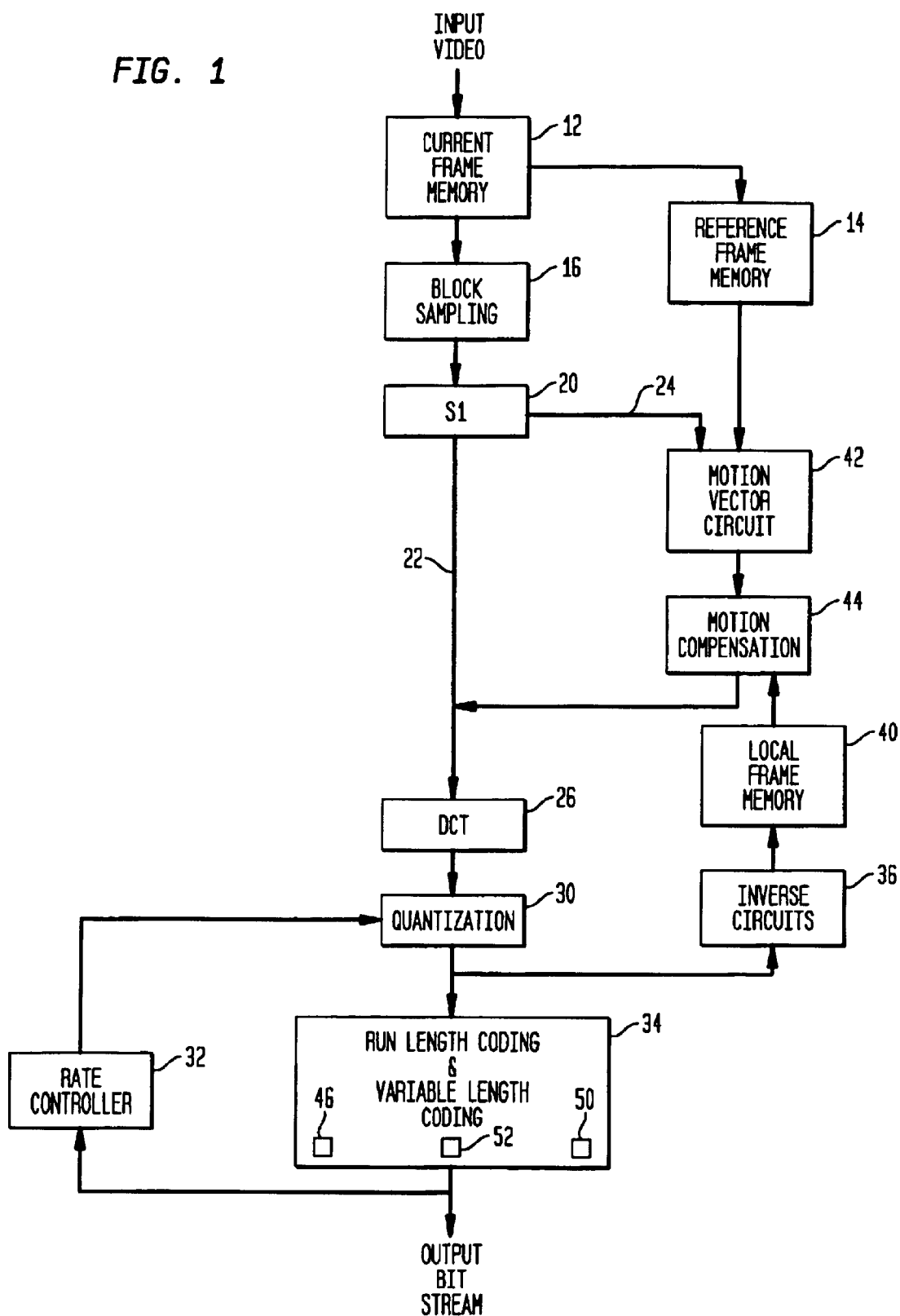

The FIGURE is a block diagram of an MPEG encoder. An input video signal contains pixel data for a video frame, and this frame data are stored in the current frame memory 12. This frame data is passed both to a reference frame memory 14 and to a sampling circuit 16. The frame data stored in the reference frame memory 14 is used as reference data in the motion estimation process, discussed below.

There are two modes of processing frame data: an intra-coded mode, and a predictive coded mode. In the intra-coded mode, each frame is coded using information only from the frame itself; and in the predictive coded mode, each frame is coded using motion compensation predicted from a part of a previous coded frame. In practice, most of the frames are coded using the predictive-coding mode.

Block sampling circuit 16 receives the data stored in the current frame memory 12 and partitions the frame data into spatially non-overlapping blocks of pixel data. To provide a reasonable level of adaptiveness, a block size of 8×8 pixels may be used. Switch 20 selectively delivers the output blocks of pixel data from the block sampling circuit 16 either to a line 22 for intra-coded processing or to a line 24 for predictive coded processing.

For the intra-coded mode, the output of circuit 16 is transmitted to a discrete cosine transform (DCT) circuit 26. Circuit 26 performs a discrete cosine transform, which is a popular mathematical transformation for converting image data to data in the frequency domain. The transformed data are then subjected to a quantization process in a quantization circuit 30 using a quantizer matrix and a quantizer step size that is provided by a rate controller 32. The quantized data is then transmitted to a run length coding and variable length coding circuit 34, which performs run-length and variable length coding of the quantized data. The output of the circuit 34 is a coded bit stream ready to be transmitted to a decoder.

This bit stream is also passed to the rate controller 32. Based on the number of bits already used at the time of encoding the block, the rate controller 32 adjusts the quantizer step so that the output bit stream satisfies the bit rate requirement of the encoder system. The quantized values obtained by circuit 30 are also passed to inverse circuits 36. These circuits reverse both the quantization performed by circuit 30 and the transform performed by circuit 26 to obtain reconstructed data. This reconstructed data is stored in memory 40 and may be used for the motion compensation process of the next input frame.

For the predictive-coding mode, the output of the block sampling circuit 16 is applied to a motion vector circuit 42. This circuit compares the current frame with a previous frame stored in memory 14 to determine motion vectors. This circuit outputs the obtained motion vectors together with the blocks of pixels supplied from sampling circuit 16.

This output is applied to a motion compensation circuit 44, which may perform motion compensation using the blocks stored in the local frame memory 40 as reference blocks. Circuit 44 generates either a differential block (coded with motion compensation) or the original block (coded without motion compensation). Circuit 44 also generates a bit indicating whether the block is coded with or without motion compensation. This data generated by circuit 44 is applied to DCT circuit 26 and then to circuits 30 and 34, and this latter circuit outputs the coded bit stream ready for transmission to the decoder.

With prior art MPEG encoders, each 8×8 block of coefficients is encoded by the VLE unit 34 and sent to the compressed output interface as part of the encoded bitstream. Each encoded coefficient is variable in length. The variable-length code is selected based on the value of the given quantized DCT coefficient and its distance from the previous non-zero coefficient in the block as determined by a predefined block scanning order. Therefore, the actual encoded size of an 8×8 block, in terms of number of bits, is unknown until after each coefficients's variable-length code has been determined within the VLE unit.

In accordance with the present invention, a digital video picture is encoded to an exact size by calculating and setting a bit limit per block in the VLE unit 34. This limit is calculated and set by microcode, schematically represented at 46. This bit limit is used in conjunction with the bitrate control algorithm and the bits per picture target to encode pictures to a predetermined size. Also, preferably, this bit limit can be adjusted dynamically by the microcode.

More specifically, as represented by block 50, the VLE unit 34 accumulates a sum of the total number of bits used per block while receiving the quantized DCT coefficients as input and outputting the variable-length code. Also, the VLE unit, as schematically represented by block 52, compares the accumulated number of used bits with the block limit value set by the microcode, and the VLE terminates its output of variable-length code for a given block when that accumulated number of used bits reaches the limit.

The VLE unit then discards the remaining coefficients of the block and finishes its encoding of the block by outputting an end of block (EOB) code. This produces a valid (according to the MPEG standard) encoded block with the discarded coefficients being implicitly encoded as coefficients with the value of zero. Because of the nature of the DCT transform and quantization used by MPEG encoding, in many, if not most instances, these coefficients would have been zero or a low value even if they were not discarded. The coefficients that are discarded from the end of the block are the high frequency coefficients that have the least effect on visual picture quality.

Part of the dynamics of this overall mechanism stems from the fact that the encoder uses variable-length codes and does not always reach the limit exactly. Preferably, any variable-length code produced is included in the encoded bitstream in its entirety. In order to accomplish this, the VLE unit 34 looks ahead one coefficient to determine if the next coefficient's variable-length code will cause the accumulated block sum to exceed the block limit. If it will exceed that limit, the VLE unit terminates the block as described above. If it will not exceed the limit, the VLE unit outputs the variable-length code and looks to the next coefficient and so on. In this way, the block limit is never exceeded, but many times it is not reached. When it is not reached exactly, the microcode recognizes this from the bit count that the VLE unit reports, and adjusts the block limit for the next block accordingly in order to use up the allocated bits per picture. By the time the last block of a picture is encoded, the predetermined picture size will be met.

In the preferred implementation, the microcode 46 sets the VLE block limits on a per macroblock basis. The microcode sets two limit values. One limit is used for luminance blocks, and the other is used for chrominance blocks. This allows for the capability of using more bits for the luminance blocks and less for the chrominance blocks or vice versa. With alternative implementations, a different limit may be set for each block of a macroblock, or a new block limit may be provided for each block after adjusting for unused bits.

The present invention is an alternative to a quantization constraining mechanism, described in the prior art, that predetermines that a set number of coefficients will be "zeroed" out. This mechanism can not be used effectively to meet exact picture sizes because it is used prior to the VLE unit in the encoding process. Since it is used prior to the VLE unit, it can not know the final output size, which is determined by the variable-length codes. In addition, it may be blanketing out coefficients that are not necessary (i.e., the encoded blocks may be small even without the constraining, making the constraining unnecessary and most likely detrimental to picture quality).

With the block limit solution used in the present invention, the remainder of the block is only zeroed out if the encoded size of the block has reached the limit. Therefore, blocks with encoded sizes smaller than the limit will be encoded and included in the encoded bitstream in their entirety. Picture quality is not compromised to the unacceptable extent of the prior art quantization constraining mechanism.

The method and system disclosed herein is useful in many digital video encoding applications. Because its intent is to encode a picture to an exact size, it is an important function for the application of video splicing and editing. It is also used in normal real-time encoding in conjunction with the encoder's bitrate algorithm to meet picture targets that are calculated.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A method for encoding digital video picture data, comprising the steps of:

partitioning the video picture data into a group of blocks;

quantizing the video picture data;

selecting at least some of the blocks, one block at a time;

encoding each of the selected blocks in a variable length encoder to form encoded coefficients having varying numbers of bits;

for each of the selected blocks, and in a given sequence of the selected blocks, i) transmitting quantized data for the block to the encoder, ii) outputting from the variable length encoder the varying bit coefficients encoded from the block, iii) accumulating a sum of the number of bits in the varying bit coefficients output from the encoder, iv) comparing said sum to a predefined block limit value, v) terminating the outputting of the varying bit coefficients encoded from the block to prevent the accumulated sum from exceeding the predefined block limit value, and vi) if all of the coefficients encoded from the block are outputted, and the accumulated sum is less than the predefined block limit value, then increasing the block limit value to allow an increased number of bits to be outputted when the encoded coefficients from the next block in the given sequence are outputted.

2. A method according to claim 1, wherein:

the group of blocks have a defined order;

the encoding step includes the step of encoding each of the selected block in said defined order;

the accumulating step includes the step of, after each time one of the encoded coefficients is outputted, calculating a look-ahead sum by adding (1) said accumulated sum, and (2) the number of bits in the encoded coefficient next in said order; and the terminating step includes the step of terminating the outputting step if said look-ahead sum is greater than the given number.

3. A method according to claim 1, wherein:

the partitioning step includes the step of partitioning the picture data into a first group of luminance blocks and a second group of chrominance blocks;

the selecting step includes the step of selecting at least some of the luminance blocks and at least some of the chrominance blocks;

the accumulating step includes the steps of accumulating a first sum of the number of bits in the outputted encoded coefficients formed from the luminance block, and accumulating a second sum of the number of bits in the outputted encoded coefficients formed from each chrominance block; and the terminating step includes the steps of terminating the outputting of the encoded coefficients formed from each luminance block at a defined time in order to prevent the first sum from exceeding a first given value, and terminating the outputting of the encoded coefficients formed from each chrominance block at a defined time in order to prevent the second sum from exceeding a second given value.

4. A method according to claim 1, wherein:

the picture data includes data for a multitude of image frame data sets;

the partitioning step includes the step of partitioning each of the image frame data sets into a respective group of blocks; and further including the step of setting a respective given number for each image frame data set.

5. A method according to claim 1, wherein the terminating step includes the step of discarding any remaining coefficients of a block when the number of output bits reaches the block limit value.

6. A method according to claim 1, further comprising the step of adjusting the given number, each time one of the encoded coefficients is output, based on the number of bits in said one of the encoded coefficients.

7. A system for encoding digital video picture data, comprising:

means for partitioning the video picture data into a group of blocks;

a quantizer for quantizing the video picture data;

means for selecting at least some of the blocks, one block at a time;

a variable length encoder means for receiving quantized data from the quantizer for each of the selected blocks and for encoding each of the selected blocks to form encoded coefficients having varying numbers of bits;

means for outputting the encoded, varying bit coefficients in a given sequence from the variable length encoder; and means for controlling the outputting of the encoded coefficients, wherein, for the outputted coefficients encoded from each block, the controlling means i) accumulates a sum of the number of bits in the outputted encoded varying bit coefficients, ii) compares said sum to a predefined block limit value, iii) terminates the outputting of the encoded varying bit coefficients to prevent the accumulated sum from exceeding the predefined block limit value, and iv) if all of the coefficients encoded from the block are outputted, and the accumulated sum is less than the predefined block limit value, then increasing the block limit value to allow an increased number of bits to be outputted when the coefficient encoded from the next block in the given sequence are outputted.

8. A system according to claim 7, wherein:

the group of block have a defined order;

the encoding means includes means for encoding each of the selected blocks in said defined order;

the accumulating means includes means for, calculating a look-ahead sum, after each time one of the encoded coefficients is outputted, by adding (1) said accumulated sum, and (2) the number of bits in the encoded coefficient next in said order; and the terminating means includes means for terminating the outputting of the encoded coefficients if said look-ahead sum is greater than the given number.

9. A system according to claim 7, wherein:

the partitioning means includes means for partitioning the picture data into a first group of luminance blocks and a second group of chrominance blocks;

the selecting means includes means for selecting at least some of the luminance blocks and at least some of the chrominance blocks;

the accumulating means includes means for accumulating a first sum of the number of bits in the outputted encoded coefficients formed from each luminance block, and accumulating a second sum of the number of bits in the outputted encoded coefficients formed from each chrominance block; and the terminating means includes means for terminating the outputting of the encoded coefficients formed from each luminance block at a defined time in order to prevent the first sum from exceeding a first given value, and terminating the outputting of the encoded coefficients formed from each chrominance blocks at a defined time in order to prevent the second sum from exceeding a second given value.

10. A system according to claim 7, wherein:

the picture data includes data for a multitude of image frame data sets;

the partitioning means includes means for partitioning each of the image frame data sets into a respective group of blocks; and further including means for setting a respective given number for each image frame data set.

11. A system according to claim 7, wherein the terminating means includes means for discarding any remaining coefficients of a block when the number of output bits reaches the block limit value.

12. A system according to claim 7, further comprising means for adjusting the given number, each time one of the encoded coefficients is output, based on the number of bits in said one of the encoded coefficients.

* * * * *